United States Patent
Woo et al.

(10) Patent No.: US 12,206,143 B2
(45) Date of Patent: Jan. 21, 2025

(54) COMPOSITE ELECTROLYTE MEMBRANE AND METHOD OF MANUFACTURING THE SAME

(71) Applicants: HYUNDAI MOTOR COMPANY, Seoul (KR); KIA CORPORATION, Seoul (KR)

(72) Inventors: Hee Jin Woo, Suwon-si (KR); Min Kyung Kim, Seongnam-si (KR)

(73) Assignees: HYUNDAI MOTOR COMPANY, Seoul (KR); KIA CORPORATION, Seoul (KR)

( * ) Notice: Subject to any disclaimer, the term of this patent is extended or adjusted under 35 U.S.C. 154(b) by 93 days.

(21) Appl. No.: 17/469,180

(22) Filed: Sep. 8, 2021

(65) Prior Publication Data

US 2022/0149406 A1    May 12, 2022

(30) Foreign Application Priority Data

Nov. 6, 2020 (KR) .................... 10-2020-0147680

(51) Int. Cl.
*H01M 8/1004* (2016.01)
*H01M 4/92* (2006.01)
*H01M 8/1069* (2016.01)

(52) U.S. Cl.
CPC .......... *H01M 8/1004* (2013.01); *H01M 4/92* (2013.01); *H01M 8/1069* (2013.01); *H01M 2300/0082* (2013.01); *H01M 2300/0094* (2013.01)

(58) Field of Classification Search
CPC .... H01M 8/1004; H01M 4/92; H01M 8/1069; H01M 2300/0082; H01M 2300/0094;
(Continued)

(56) References Cited

U.S. PATENT DOCUMENTS

| 9,397,357 B2 * | 7/2016 | Bessarabov ......... H01M 8/1004 |
| 2007/0072036 A1 * | 3/2007 | Berta ................... H01M 8/1062 |
| | | 429/432 |
| 2020/0099061 A1 * | 3/2020 | Price ....................... C25B 13/02 |

FOREIGN PATENT DOCUMENTS

JP  4032282 B2 *  1/2008
KR  10-2016-0083713 A  7/2016
(Continued)

OTHER PUBLICATIONS

Trogadas, Degradation Mitigation in Polymer Electrolyte Membranes Using Cerium Oxide as a Regenerative Free-Radical Scavenger, 2008, Electrochemical and Solid State Letters, 11, B113-B116 (Year: 2008).*

*Primary Examiner* — Daniel S Gatewood
(74) *Attorney, Agent, or Firm* — Morgan, Lewis & Bockius LLP

(57) ABSTRACT

The present disclosure relates to a composite electrolyte membrane and a method of manufacturing the same. A catalyst composite layer in the composite electrolyte membrane uniformly includes a catalyst and an antioxidant, whereby it is possible to inhibit generation of hydrogen peroxide by side reaction. In addition, the catalyst composite layer is formed as a separate layer, whereby the catalyst composite layer is instead degraded, greatly inhibiting membrane degradation even in the case in which radicals attack an ionomer due to small side reaction. Furthermore, it is possible to control the position of the catalyst composite layer including the catalyst and the antioxidant by adjusting the thicknesses of a second ion exchange layer and the catalyst composite layer, whereby it is possible to protect a specific degradation position, and therefore it is possible to efficiently improve membrane durability.

6 Claims, 3 Drawing Sheets

(58) Field of Classification Search
CPC .. H01M 4/8663; H01M 4/8668; H01M 4/881; H01M 4/8814; H01M 4/8882; H01M 8/1023; H01M 8/1039; H01M 8/1067; H01M 8/1053; H01M 2008/1095; H01M 4/86; H01M 4/88; H01M 8/1051; H01M 8/1058; H01M 8/1081; Y02E 60/50; Y02P 70/50

See application file for complete search history.

(56) References Cited

FOREIGN PATENT DOCUMENTS

| KR | 10-1669236 B1 | 10/2016 |
|---|---|---|
| KR | 10-2017-0027142 A | 3/2017 |
| KR | 10-2019-0037674 A | 4/2019 |

* cited by examiner

[fig. 1]
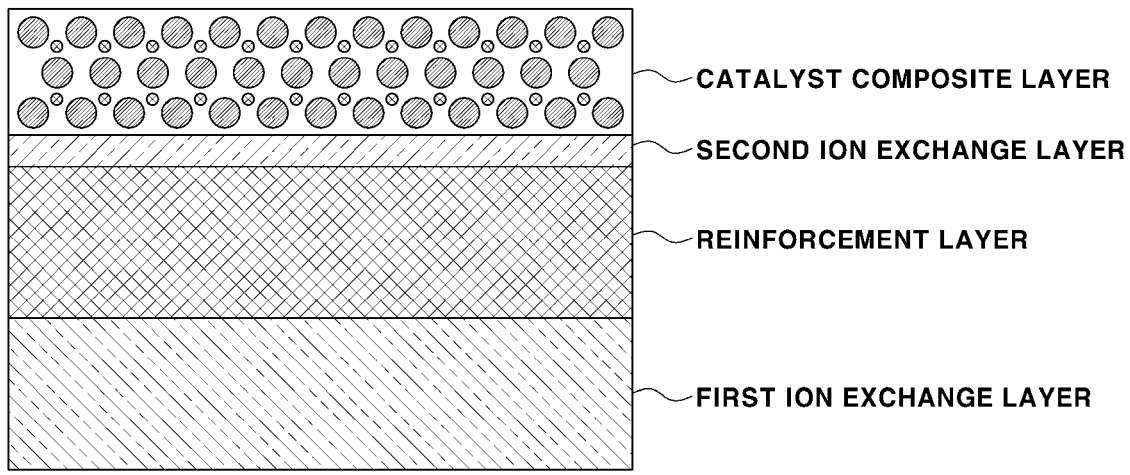
[fig. 2]
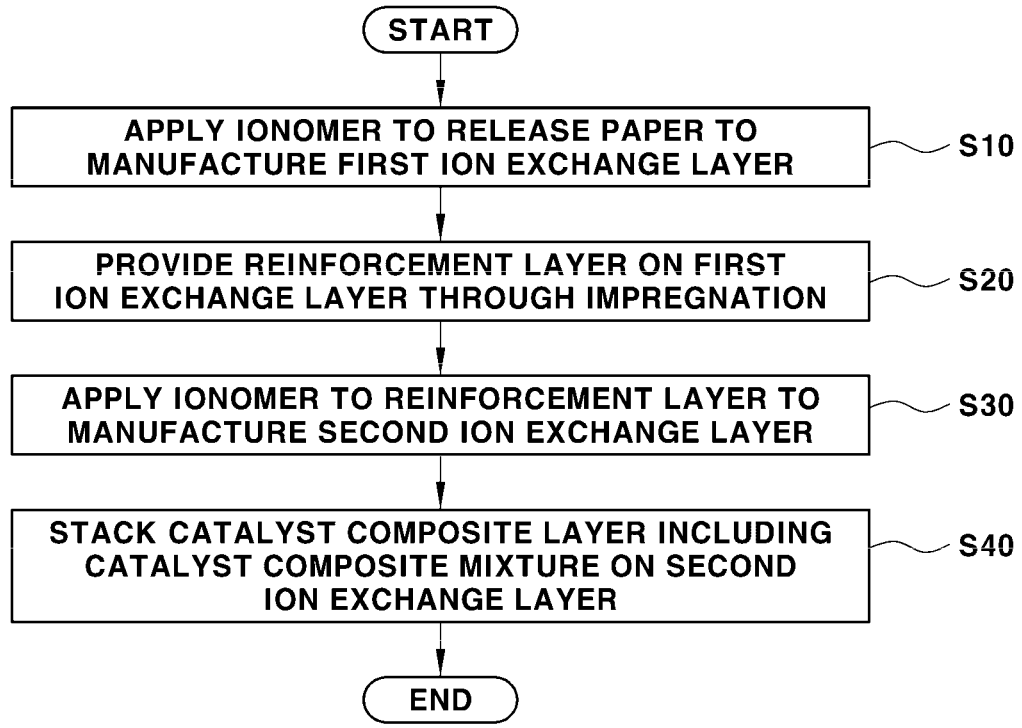

[fig. 3a]
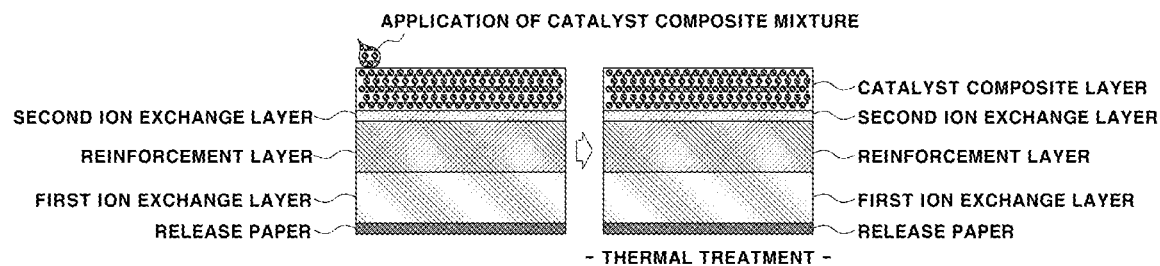
FIG. 3A
[fig. 3b]
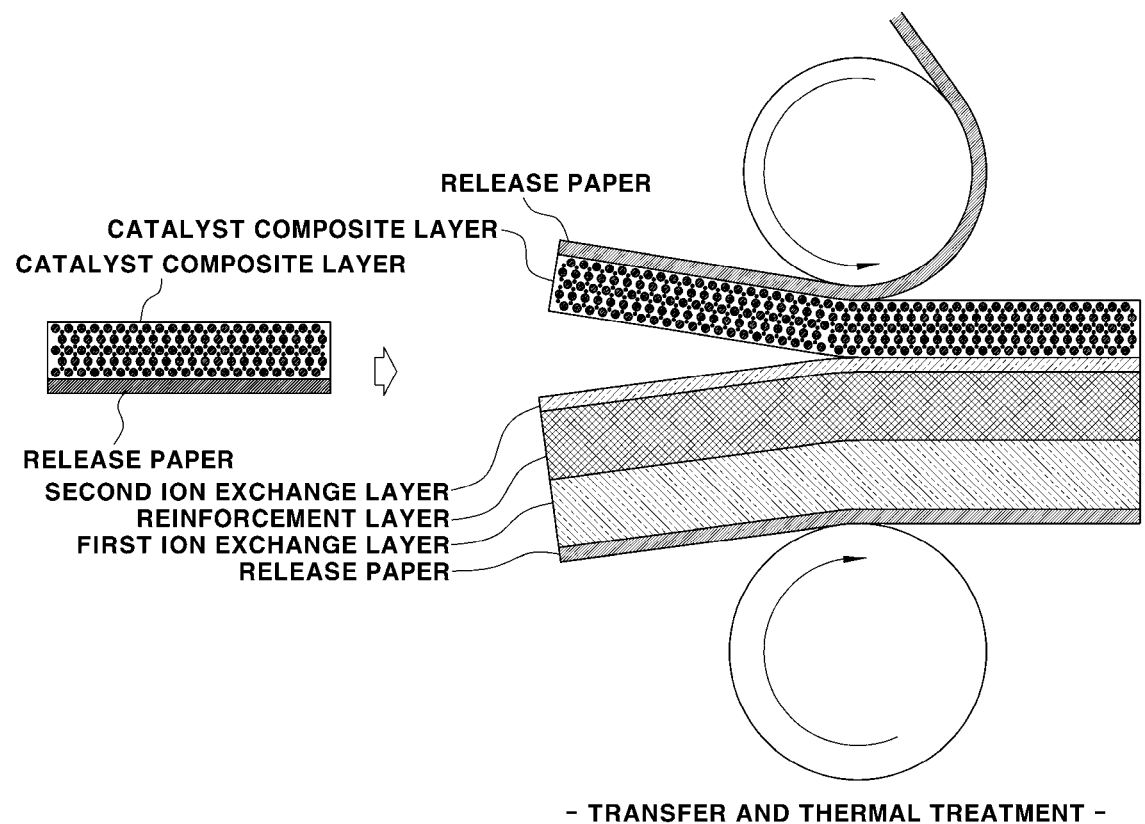

[fig. 4]
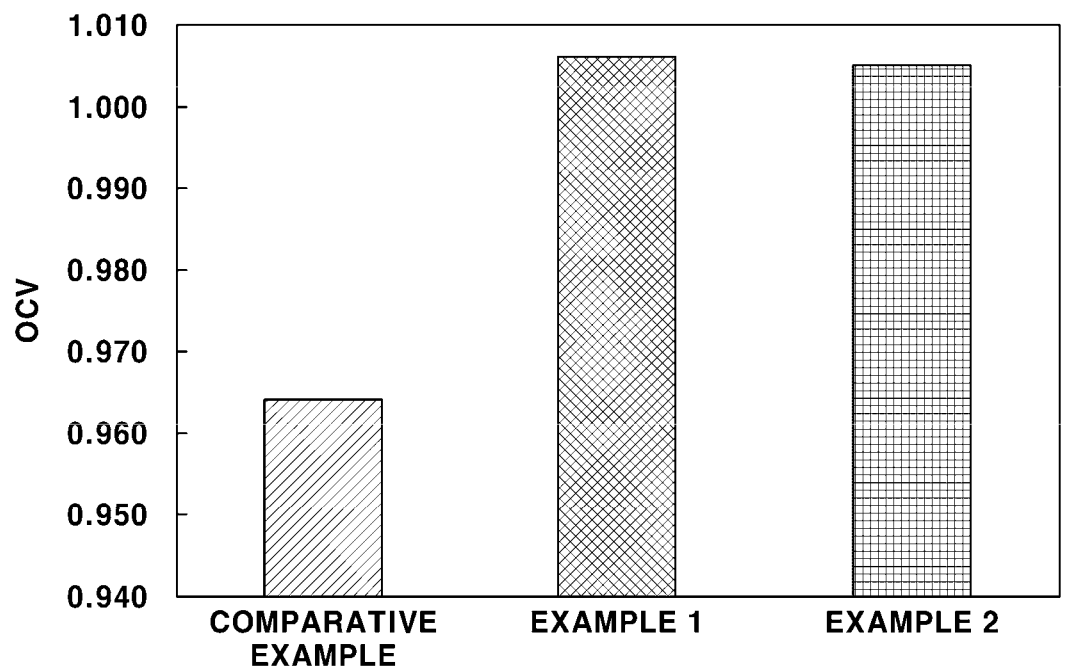
[fig. 5]
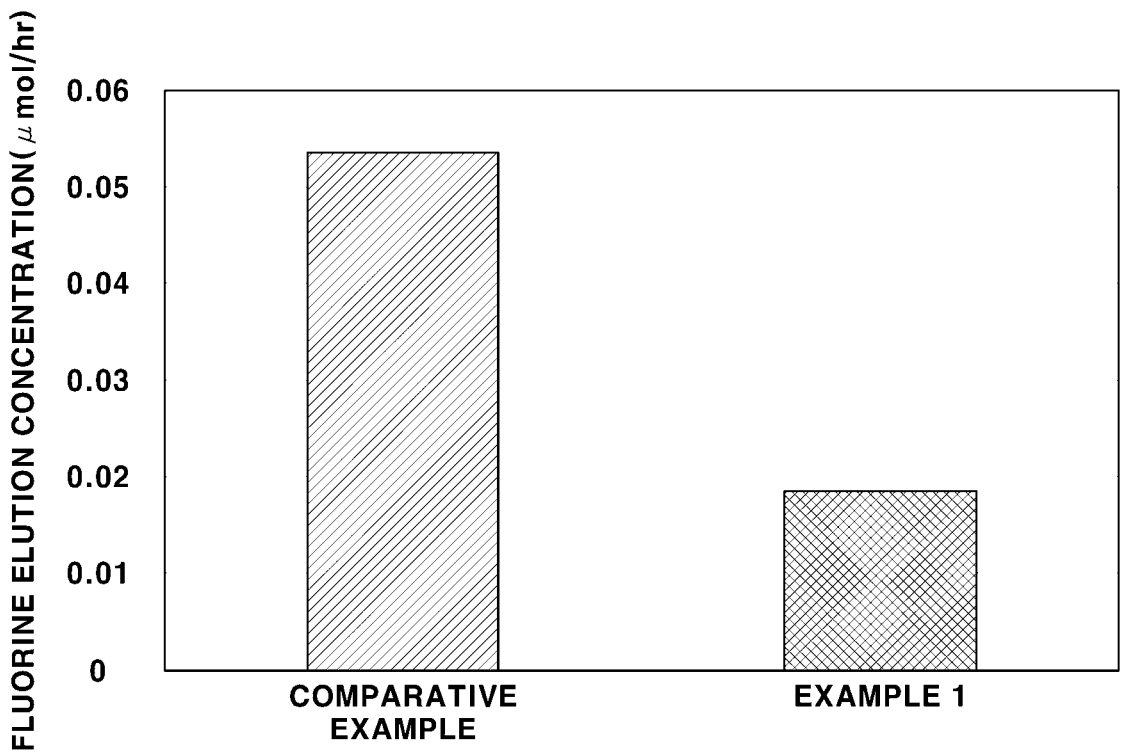

COMPOSITE ELECTROLYTE MEMBRANE AND METHOD OF MANUFACTURING THE SAME

CROSS-REFERENCE TO RELATED APPLICATION

This application claims, under 35 U.S.C. § 119(a), the benefit of priority to Korean Patent Application No. 10-2020-0147680 filed on Nov. 6, 2020, the entire contents of which are incorporated herein by reference.

BACKGROUND

(a) Technical Field

The present disclosure relates to a composite electrolyte membrane capable of being efficiently protected from degradation that may occur at a specific position thereof by adjusting the position of a catalyst composite layer including a catalyst and an antioxidant and a method of manufacturing the same.

(b) Background Art

To date, a polymer electrolyte membrane fuel cell (PEMFC) has been most used as a fuel cell for vehicles. The polymer electrolyte membrane fuel cell must be stably operated within a wide range of current density in order to normally exhibit high output performance of at least several tens of kW under various driving conditions of a vehicle.

A fuel cell is used in the form of a stack in which unit cells are assembled in a stacked state in order to satisfy required output. Each unit cell is configured such that a gas diffusion layer (GDL) and a gasket are stacked on an outer portion of a membrane-electrode assembly (MEA), i.e. an outer portion at which a cathode and an anode are located, and a separator (or a bipolar plate) having a flow field, through which reaction gas (hydrogen as a fuel and oxygen or air as an oxidant) is supplied and a coolant passes, is provided outside the gas diffusion layer. Several hundred so unit cells are stacked, and end plates are coupled to outermost sides of the unit cells in order to support the unit cells.

Electrochemical reaction for generation of electricity in the fuel cell occurs in a membrane-electrode assembly (MEA) constituted by an electrolyte membrane and electrodes, such as an anode and a cathode. The electrochemical reaction of the fuel cell occurs as follows. As represented by Reaction Formula [1] below, hydrogen supplied to the anode, which is an oxidation electrode, of the fuel cell is divided into protons and electrons as the result of hydrogen oxidation reaction (HOR), the protons move to the cathode, which is a reduction electrode, through the membrane, and the electrons move to the cathode through an external circuit. As represented by Reaction Formula [2] below, the protons and the electrons react with oxygen molecules supplied from outside at the cathode as the result of oxygen reduction reaction (ORR), whereby electricity and heat are generated and at the same time water is generated as a reaction byproduct.

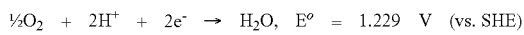

Here, $E^o$ indicates standard electrode potential, and SHE indicates a standard hydrogen electrode.

Meanwhile, a polymer electrolyte membrane in the membrane-electrode assembly has a polymer electrolyte membrane structure in which ink having a structure containing a platinum catalyst in which the platinum catalyst is mixed with an ionomer is applied to one surface of expanded polytetrafluoroethylene (ePTFE). In this case, platinum catalyst particles supported on a support are deposited in micropores formed in the surface of ePTFE, whereby a path along which protons move is blocked. As a result, ionic conductivity, as an intrinsic function of the membrane, may be reduced and the function of the catalyst may be reduced. In the case in which radicals are not efficiently inhibited, therefore, the radicals may attach the ionomer in the electrolyte membrane, whereby the membrane may be degraded and thus durability of the fuel cell may be reduced.

In the case in which an antioxidant is used in order to prevent such degradation, radicals (hydroxyl radical, —OH) formed as the result of decomposition of hydrogen peroxide ($H_2O_2$) generated by side reaction are converted into $H_2O$, whereby it is possible to inhibit the radicals from decomposing an ion exchange material. In the case in which a large amount of hydrogen peroxide is generated or hydrogen peroxide is present alone, however, efficiency of the antioxidant is reduced. Unlike this, the catalyst in the mixture layer having the supported catalyst reacts as represented by Reaction Formula [3] below

The catalyst converts hydrogen peroxide into $H_2O$ before hydrogen peroxide is decomposed into radicals. In the case in which the antioxidant and the catalyst are disposed in the same space, therefore, the catalyst primarily converts hydrogen peroxide into $H_2O$. In the case in which hydrogen peroxide is decomposed into radicals, the antioxidant secondarily converts radicals into $H_2O_2$." Consequently, it is possible to more efficiently inhibit formation of radicals. In addition, the catalyst allows hydrogen ($H_2$) and oxygen ($O_2$) crossing over to opposite electrodes through the membrane to react with each other and thus to be converted into water ($H_2O$), thereby reducing a decrease in open circuit voltage (OCV) due to crossover.

However, there is a need for technology in which, when degradation frequently occurs at a specific position in the polymer electrolyte membrane, the catalyst and the antioxidant are included only at the specific position in a high content, whereby degradation is efficiently prevented.

PRIOR ART DOCUMENT

Patent Document

Korean Patent Application Publication No. 10-2017-0027142

The above information disclosed in this Background section is provided only for enhancement of understanding of the background of the invention and therefore it may contain information that does not form the prior art that is already known in this country to a person of ordinary skill in the art.

SUMMARY OF THE DISCLOSURE

The present disclosure has been made in an effort to solve the above-described problems associated with the prior art.

It is an object of the present disclosure to provide a composite electrolyte membrane including a first ion exchange layer including a first ionomer, a porous reinforcement layer located on the first ion exchange layer, a second ion exchange layer located on the reinforcement layer, and a catalyst composite layer located on the second ion exchange layer, the catalyst composite layer including a catalyst and an antioxidant, wherein the thicknesses of the second ion exchange layer and the catalyst composite layer are changed while the sum of the thickness of the second ion exchange layer and the thickness of the catalyst composite layer is maintained equal to the thickness of the first ion exchange layer.

The objects of the present disclosure are not limited to those described above. The objects of the present disclosure will be clearly understood from the following description and could be implemented by means defined in the claims and a combination thereof.

In one aspect, the present disclosure provides a composite electrolyte membrane including a first ion exchange layer including a first ionomer, a porous reinforcement layer located on the first ion exchange layer, the reinforcement layer being impregnated with a second ionomer, a second ion exchange layer located on the reinforcement layer, the second ion exchange layer including a third ionomer; and a catalyst composite layer located on the second ion exchange layer, the catalyst composite layer including a catalyst, an antioxidant, and a forth ionomer.

The sum of the thickness of the second ion exchange layer and the thickness of the catalyst composite layer may be equal to the thickness of the first ion exchange layer.

The thickness of the first ion exchange layer may be 0.1 to 10 μm.

The thickness of the second ion exchange layer may be 10 to 30% of the thickness of the first ion exchange layer.

The thickness ratio of the second ion exchange layer to the catalyst composite layer may be 1:2 to 9.

The content of the antioxidant may be 0.1 to 10 parts by weight based on 100 parts by weight of the fourth ionomer in the catalyst composite layer.

The catalyst may include at least one catalyst metal selected from the group consisting of platinum (Pt), palladium (Pd), ruthenium (Ru), iridium (Ir), gold (Au), silver (Ag), chromium (Cr), manganese (Mn), iron (Fe), cobalt (Co), nickel (Ni), copper (Cu), molybdenum (Mo), and yttrium (Y).

The content of the catalyst metal may be 0.1 to 15 parts by weight based on 100 parts by weight of the fourth ionomer in the catalyst composite layer.

The first to fourth ionomers included in each of the first ion exchange layer, the reinforcement layer, the second ion exchange layer, and the catalyst composite layer, respectively, may include at least one selected from the group consisting of a perfluorinated sulfonic acid (PFSA)-based ionomer, a hydrocarbon-based ionomer, and a combination thereof. The first to fourth ionomers included in each of the first ion exchange layer, the reinforcement layer, the second ion exchange layer, and the catalyst composite layer may be the same of different from each other.

In another aspect, the present disclosure provides a method of manufacturing a composite electrolyte membrane, including applying a first ionomer to release paper to manufacture a first ion exchange layer, providing a reinforcement layer on the first ion exchange layer through impregnation with a second ionomer, applying a third ionomer to the reinforcement layer to manufacture a second ion exchange layer, and stacking a catalyst composite layer including a catalyst composite mixture on the second ion exchange layer.

The stacking a catalyst composite layer may include applying a catalyst composite mixture to the second ion exchange layer and thermally treating the catalyst composite mixture applied to the second ion exchange layer.

The stacking a catalyst composite layer may include applying a catalyst composite mixture to release paper to manufacture a catalyst composite layer and transferring and thermally treating the catalyst composite layer to attach to the second ion exchange layer.

The catalyst composite mixture may include a solid content including a catalyst, an antioxidant, and a fourth ionomer and a solvent.

The catalyst composite mixture may include 100 parts by weight of the solvent and 5 to 30 parts by weight of the solid content.

Other aspects and preferred embodiments of the disclosure are discussed infra.

BRIEF DESCRIPTION OF THE DRAWINGS

The above and other features of the present disclosure will now be described in detail with reference to certain exemplary embodiments thereof illustrated in the accompanying drawings which are given hereinbelow by way of illustration only, and thus are not limitative of the present disclosure, and wherein:

FIG. 1 is a sectional view schematically showing a composite electrolyte membrane according to an embodiment of the present disclosure;

FIG. 2 is a flowchart showing a method of manufacturing a composite electrolyte membrane according to an embodiment of the present disclosure;

FIG. 3A is a view showing a step of directly applying a catalyst composite mixture to stack a catalyst composite layer in the method of manufacturing the composite electrolyte membrane according to the embodiment of the present disclosure;

FIG. 3B is a view showing a step of stacking a catalyst composite layer manufactured using a catalyst composite mixture in the method of manufacturing the composite electrolyte membrane according to the embodiment of the present disclosure;

FIG. 4 is a graph showing the result of comparison in open circuit voltage (OCV) between composite electrolyte membranes manufactured according to Example 1 and Example 2 of the present disclosure and an electrolyte membrane manufactured according to Comparative Example; and FIG. 5 is a graph showing the result of comparison in post-endurance fluorine elution concentration between the composite electrolyte membrane manufactured according to Example 1 and the electrolyte membrane manufactured according to Comparative Example.

It should be understood that the appended drawings are not necessarily to scale, presenting a somewhat simplified representation of various preferred features illustrative of the basic principles of the disclosure. The specific design features of the present disclosure as disclosed herein, including, for example, specific dimensions, orientations, locations, and shapes, will be determined in part by the particular intended application and use environment.

In the figures, reference numbers refer to the same or equivalent parts of the present disclosure throughout the several figures of the drawing.

DETAILED DESCRIPTION

The objects described above, and other objects, features and advantages will be clearly understood from the following preferred embodiments with reference to the attached drawings. However, the present disclosure is not limited to the embodiments and will be embodied in different forms. The embodiments are suggested only to offer thorough and complete understanding of the disclosed contents and sufficiently inform those skilled in the art of the technical concept of the present disclosure.

Like reference numbers refer to like elements throughout the description of the figures. In the drawings, the sizes of structures are exaggerated for clarity. It will be understood that, although the terms "first", "second", etc. may be used herein to describe various elements, corresponding elements should not be understood to be limited by these terms, which are used only to distinguish one element from another. For example, within the scope defined by the present disclosure, a first element may be referred to as a second element and similarly, a second element may be referred to as a first element. Singular forms are intended to include plural forms as well, unless the context clearly indicates otherwise.

It will be further understood that the terms "comprises", "has" and the like, when used in this specification, specify the presence of stated features, numbers, steps, operations, elements, components or combinations thereof, but do not preclude the presence or addition of one or more other features, numbers, steps, operations, elements, components, or combinations thereof. In addition, it will be understood that, when an element such as a layer, film, region or substrate is referred to as being "on" another element, it can be directly on the other element or an intervening element may also be present. It will also be understood that, when an element such as a layer, film, region or substrate is referred to as being "under" another element, it can be directly under the other element or an intervening element may also be present.

Unless the context clearly indicates otherwise, all numbers, figures and/or expressions that represent ingredients, reaction conditions, polymer compositions and amounts of mixtures used in the specification are approximations that reflect various uncertainties of measurement occurring inherently in obtaining these figures among other things. For this reason, it should be understood that, in all cases, the term "about" should modify all numbers, figures and/or expressions. In addition, when numeric ranges are disclosed in the description, these ranges are continuous and include all numbers from the minimum to the maximum including the maximum within the range unless otherwise defined. Furthermore, when the range refers to an integer, it includes all integers from the minimum to the maximum including the maximum within the range, unless otherwise defined.

It should be understood that, in the specification, when the range refers to a parameter, the parameter encompasses all figures including end points disclosed within the range. For example, the range of "5 to 10" includes figures of 5, 6, 7, 8, 9, and 10, as well as arbitrary sub-ranges such as ranges of 6 to 10, 7 to 10, 6 to 9, and 7 to 9, and any figures, such as 5.5, 6.5, 7.5, 5.5 to 8.5 and 6.5 to 9, between appropriate integers that fall within the range. In addition, for example, the range of "10% to 30%" encompasses all integers that include figures such as 10%, 11%, 12% and 13%, as well as 30%, and any sub-ranges of 10% to 15%, 12% to 18%, or 20% to 30%, as well as any figures, such as 10.5%, 15.5% and 25.5%, between appropriate integers that fall within the range.

FIG. 1 is a sectional view schematically showing a composite electrolyte membrane according to an embodiment of the present disclosure. Referring to this, the composite electrolyte membrane includes a first ion exchange layer, a reinforcement layer located on the first ion exchange layer, a second ion exchange layer located on the reinforcement layer, and a catalyst composite layer located on the second ion exchange layer. In the composite electrolyte membrane according to the embodiment of the present disclosure, the sum of the thickness of the second ion exchange layer and the thickness of the catalyst composite layer is equal to the thickness of the first ion exchange layer, and it is possible to protect a specific degradation position by adjusting the thicknesses of the second ion exchange layer and the catalyst composite layer, whereby it is possible to efficiently improve membrane durability.

The first ion exchange layer according to the embodiment of the present disclosure is not particularly restricted as long as the first ion exchange layer serves as a transmission path along which protons generated at an anode are conducted to a cathode while serving as a binder capable of fixing an electrode and the reinforcement layer. The first ion exchange layer may include a first ionomer. The first ionomer may be a normal ionomer that can be used in the present disclosure, and may include, for example, at least one selected from the group consisting of a perfluorinated sulfonic acid (PFSA)-based ionomer, a polymer including at least one sulfonated aromatic compound, such as phenol sulfonic acid, polystyrene sulfonic acid, or fluorinated styrene sulfonic acid, and a combination thereof, and a hydrocarbon-based ionomer. The first ionomer is preferably a perfluorinated sulfonic acid-based ionomer, without being limited to a specific kind. The thickness of the first ion exchange layer may be 0.1 to 10 μm. If the thickness of the first ion exchange layer is less than 0.1 μm, the reinforcement layer is rapidly exposed when the ionomer is degraded, whereby durability of the electrolyte membrane is reduced. If the thickness of the first ion exchange layer is greater than 10 μm, the ionomer layer is too thick, whereby ion transmission ability is reduced.

The reinforcement layer according to the embodiment of the present disclosure is not particularly restricted as long as the reinforcement layer serves as a transmission path along which protons generated at the anode are conducted to the cathode. The reinforcement layer may be located on the first ion exchange layer, and may include a porous film impregnated with a second ionomer. The second ionomer included in the reinforcement layer is the same as the one defined above. The reinforcement layer may include a normal porous film that can be used in the present disclosure, and may include, for example, at least one selected from the group consisting of polytetrafluoroethylene (PTFE), poly(ethylene terephthalate) (PET), polybenzoxazole (PBO), polyethylene (PE), polypropylene (PP), and polyimide (PI). The reinforcement layer preferably includes polytetrafluoroethylene (PTFE), although not limited as including only a specific kind.

The second ion exchange layer according to the embodiment of the present disclosure is not particularly restricted as long as the first ion exchange layer serves as a transmission path along which protons generated at the anode are conducted to the cathode while serving as a binder capable of fixing the electrode and the reinforcement layer. In the same manner as the first ion exchange layer, the second ion exchange layer may include a third ionomer, preferably, a powder-type ionomer that is sufficiently stirred and dispersed in a solvent. The third ionomer may be a normal ionomer that can be used in the present disclosure, and may be identical to or different from the ionomer included in the first ion exchange layer. In addition, the thickness of the second ion exchange layer may be adjusted to protect a specific degradation position in the composite electrolyte membrane. Preferably, the thickness of the second ion exchange layer is 10 to 30% of the thickness of the first ion exchange layer. If the thickness of the second ion exchange layer is less than 10% of the thickness of the first ion exchange layer, there occurs deviation from a voltage range in which hydrogen peroxide generated by side reaction joins catalyst particles and is thus reduced into water, whereby catalyst efficiency is reduced. If the thickness of the second ion exchange layer is greater than 30% of the thickness of the first ion exchange layer, the amount of a catalyst material that is used is reduced, whereby the amount of a catalyst is less than the amount of hydrogen peroxide and thus reduction in degradation rate is insignificant.

The catalyst composite layer according to the embodiment of the present disclosure is not particularly restricted as long as the catalyst composite layer is constituted as a separate layer capable of inhibiting side reaction that may occur in the composite electrolyte membrane. The catalyst composite layer may be located on the second ion exchange layer, and may include a catalyst, an antioxidant, and a fourth ionomer. The fourth ionomer included in the catalyst composite layer may be identical to or different from the ionomer included in the first ion exchanger layer or the second ion exchange layer. The antioxidant may be a normal antioxidant that can be used in the present disclosure, and may include, for example, at least one selected from the group consisting of cerium salt, cerium oxide, cerium zirconium oxide, cerium sulfate, manganese sulfate, manganese oxide, and a combination thereof.

Preferably, the antioxidant includes cerium salt, cerium oxide, or a combination thereof, although not limited as including a specific kind. The content of the antioxidant may be 0.1 to 10 parts by weight based on 100 parts by weight of the fourth ionomer in the catalyst composite layer. If the content of the antioxidant is less than 0.1 parts by weight based on 100 parts by weight of the fourth ionomer, efficiency of the antioxidant is reduced. If the content of the antioxidant is greater than 10 parts by weight based on 100 parts by weight of the fourth ionomer, performance is reduced. In addition, the catalyst may be a normal catalyst that can be used in the present disclosure, preferably a catalyst metal supported on a carbon support. The carbon support may be a normal carbon support that can be used in the present disclosure, and may include, for example, at least one selected from the group consisting of graphite, carbon black, activated carbon, carbon nanotube, carbon nanofiber, carbon nanowire, and a combination thereof, but it is not limited to a specific kind disclosed herein. In addition, the catalyst metal may be a normal catalyst metal that can be used in the present disclosure, and may include, for example, at least one selected from the group consisting of platinum (Pt), palladium (Pd), ruthenium (Ru), iridium (Ir), gold (Au), silver (Ag), chromium (Cr), manganese (Mn), iron (Fe), cobalt (Co), nickel (Ni), copper (Cu), molybdenum (Mo), yttrium (Y), and a combination thereof. The catalyst metal preferably includes a single or an alloy element containing Pt, but it is not limited to a specific kind. The content of the catalyst metal may be 0.1 to 15 parts by weight based on 100 parts by weight of the fourth ionomer in the catalyst composite layer. If the content of the catalyst metal is less than 0.1 parts by weight based on 100 parts by weight of the fourth ionomer, the amount of the catalyst is reduced, compared to the amount of hydrogen peroxide that is generated, whereby reduction in degradation rate is insignificant. If the content of the catalyst metal is greater than 15 parts by weight based on 100 parts by weight of the fourth ionomer, the amount of the catalyst is increased, compared to the amount of hydrogen peroxide that is generated, whereby efficiency is reduced. In the present disclosure, the thickness of the catalyst composite layer may be adjusted in order to protect a specific degradation position in the composite electrolyte membrane together with the second ion exchange layer. Preferably, the sum of the thickness of the second ion exchange layer and the thickness of the catalyst composite layer is maintained equal to the thickness of the first ion exchange layer, and the thickness ratio of the second ion exchange layer to the catalyst composite layer is 1:2 to 9. If the thickness ratio of the second ion exchange layer to the catalyst composite layer is 1:less than 2, there occurs deviation from a voltage range in which hydrogen peroxide generated by side reaction joins catalyst particles and is thus reduced into water, whereby catalyst efficiency is reduced. If the thickness ratio of the second ion exchange layer to the catalyst composite layer is 1:more than 9, the amount of the catalyst is increased, compared to the amount of hydrogen peroxide that is generated, whereby efficiency is reduced.

That is, the composite electrolyte membrane according to the embodiment of the present disclosure is characterized in that it is possible to control the position of the catalyst composite layer including the catalyst and the antioxidant by adjusting the thicknesses of the second ion exchange layer and the catalyst composite layer while the sum of the thickness of the second ion exchange layer and the thickness of the catalyst composite layer is maintained equal to the thickness of the first ion exchange layer, whereby it is possible to protect a specific degradation position, and therefore it is possible to efficiently improve membrane durability.

FIG. 2 is a flowchart showing a method of manufacturing a composite electrolyte membrane according to an embodiment of the present disclosure.

Referring to this, the method includes a step (S10) of applying a first ionomer to release paper to manufacture a first ion exchange layer, a step (S20) of providing a reinforcement layer on the first ion exchange layer through impregnation with a second ionomer, a step (S30) of applying a third ionomer to the reinforcement layer to manufacture a second ion exchange layer, and a step (S40) of stacking a catalyst composite layer including a catalyst composite mixture on the second ion exchange layer.

The step (S10) of manufacturing a first ion exchange layer is a step of applying a first ionomer to release paper to manufacture a first ion exchange layer. The second to fourth ionomers may be identical to the ionomer included in the first ion exchange layer described above. Preferably, the first ionomer is a powder-type ionomer that is sufficiently stirred and dispersed in a solvent. In addition, the solvent may be a normal solvent that can be used in the present disclosure by those skilled in the art, and may be at least one selected from the group consisting of isopropyl alcohol (IPA), n-propyl alcohol (nPA), and ethyl alcohol), deionized water, or a mixture thereof, but is not limited to a specific kind. The method of applying the first ionomer sufficiently stirred in the solvent on the release paper may be a normal method that can be used in the present disclosure, and, for example, at least one selected from the group consisting of bar coating, comma coating, gravure coating, slot-die coating, screen printing, spray coating, and a combination thereof may be used, but the method is not limited to a specific method.

The step (S20) of providing a reinforcement layer through impregnation is a step of stacking a reinforcement layer on the first ion exchange layer and impregnating the reinforcement layer with a second ionomer. The reinforcement layer may be identical to the porous film described above. The method of stacking the reinforcement layer on the first ion exchange layer may be a normal method that can be used in the present disclosure, and, for example, roll lamination or direct coating may be used, but the method is not limited to a specific method.

The step (S30) of manufacturing a second ion exchange layer is a step of applying a third ionomer to the reinforcement layer stacked and impregnated on the first ion exchange layer to manufacture a second ion exchange layer. The first, second and fourth ionomers may be identical to the ionomer included in the second ion exchange layer described above. The method of applying the third ionomer to the release paper may be a normal method that can be used in the present disclosure, and may be identical to or different from the method of applying the first ion exchange layer. In addition, a step of drying the second ion exchange layer after application thereof may be further included. The drying step may be performed under specific temperature, time, and humidity conditions. If the specific temperature, time, and humidity conditions are not satisfied, the physical properties of the third ionomer are changed, whereby performance and durability thereof are reduced. After drying, the thickness of the first ion exchange layer may be 0.1 to 10 μm, and the thickness of the second ion exchange layer may be 10 to 30% of the thickness of the first ion exchange layer.

The step (S40) of stacking a catalyst composite layer is a step of stacking a catalyst composite layer including a catalyst composite mixture on the second ion exchange layer manufactured by applying the fourth ionomer to the reinforcement layer. The catalyst composite mixture may include a solid content including a catalyst, an antioxidant, and a fourth ionomer and a solvent. The catalyst, the antioxidant, and the fourth ionomer may be identical to those in the catalyst composite layer described above. The solvent may be a normal solvent that can be used in the present disclosure, and may include, for example, at least one selected from the group consisting of alcohol, water, and a combination thereof, but is not limited to a specific kind. The catalyst composite mixture may include 100 parts by weight of the solvent and 5 to 30 parts by weight of the solid content. If the content of the solid content is less than 5 parts by weight based on 100 parts by weight of the solvent, solution viscosity is reduced, whereby it is difficult to have a desired thickness. If the content of the solid content is greater than 30 parts by weight based on 100 parts by weight of the solvent, solution viscosity is increased, and coating is impossible. The step of stacking the catalyst composite layer may be performed using a method that can be used in the present disclosure. Preferably, a catalyst composite mixture is directly applied and stacked (S41), as shown in FIG. 3A, or a catalyst composite layer manufactured using a catalyst composite mixture is stacked (S42), as shown in FIG. 3B. The step (S41) of directly applying and stacking a catalyst composite mixture may include a step of applying a catalyst composite mixture to the second ion exchange layer and a step of thermally treating the catalyst composite mixture applied to the second ion exchange layer. The application method may be identical to or different from the method of applying the first ion exchange layer. The application step may further include a drying step. The drying step may be performed at a temperature of 80 to 150° C. If the specific temperature, time, and humidity conditions are not satisfied, the physical properties of the ionomer are changed, whereby performance and durability thereof are reduced. After drying, thermal treatment may be finally performed to manufacture a composite electrolyte membrane. Thermal treatment may be performed at a temperature of 120 to 180° C. If the specific temperature, time, and humidity conditions are not satisfied, the physical properties of the ionomer are changed, whereby performance and durability thereof are reduced. In addition, the step (S42) of stacking a catalyst composite layer manufactured using a catalyst composite mixture may include a step of applying a catalyst composite mixture to release paper to manufacture a catalyst composite layer and a step of transferring the catalyst composite layer to the second ion exchange layer and thermally treating the same. The application method may be identical to or different from the method of applying the first ion exchange layer. The application step may further include a drying step in order to manufacture the catalyst composite layer. The drying step may be performed under specific temperature, time, and humidity conditions. If the specific temperature, time, and humidity conditions are not satisfied, the physical properties of the ionomer are changed, whereby performance and durability thereof are reduced. Subsequently, the catalyst composite layer is transferred to the second ion exchange layer and is thermally treated to finally manufacture the catalyst composite layer. The method of transferring the catalyst composite layer may be a normal method that can be used in the present disclosure, and is not limited to a specific method. After transfer, thermal treatment may be performed under specific temperature, time, and humidity conditions. If the specific temperature, time, and humidity conditions are not satisfied, the physical properties of the ionomer are changed, whereby performance and durability thereof are reduced. After the step of stacking the catalyst composite layer, the thickness ratio of the second ion exchange layer to the catalyst composite layer may be 1:2 to 9.

Consequently, the composite electrolyte membrane manufactured according to the embodiment of the present disclosure is characterized in that it is possible to control the position of the catalyst composite layer including the catalyst and the antioxidant by adjusting the thicknesses of the second ion exchange layer and the catalyst composite layer while the sum of the thickness of the second ion exchange layer and the thickness of the catalyst composite layer is maintained equal to the thickness of the first ion exchange layer, whereby it is possible to protect a specific degradation position, and therefore it is possible to efficiently improve membrane durability.

Hereinafter, the present disclosure will be described in more detail with reference to examples. However, the following examples are merely an illustration to assist in understanding the present disclosure, and the present disclosure is not limited by the following examples.

Example 1—Composite Electrolyte Membrane Manufactured by Directly Applying Catalyst Composite Mixture (S10) 35 g of an Perfluorosulfonic acids (PFSA) containing sulfonic acid as a first ionomer was stirred in 270 mL of a solvent, and the ionomer solution was applied to release paper using a slot-die coating method to manufacture a first ion exchange layer.

(S20) A porous film, ePTFE, was prepared as a reinforcement layer, and Perfluorosulfonic acids (PFSA) containing sulfonic acid as a second ionomer was provided on the first ion exchange layer through impregnation.

(S30) 35 g of Perfluorosulfonic acids (PFSA) containing sulfonic acid as a third ionomer was stirred in 270 mL of a solvent, the ionomer solution was applied to the reinforcement layer using a slot-die coating method, and drying was performed at a temperature of 100° C. to manufacture a second ion exchange layer.

(S41) 1.2 g of a carbon-supported Pt metal catalyst, 0.005 g of an antioxidant, and 35 g of Perfluorosulfonic acids (PFSA) containing sulfonic acid as a fourth ionomer, as a solid content, were mixed with a 275 mL of a solvent to manufacture a catalyst composite mixture. Subsequently, the catalyst composite mixture was applied to the second ion exchange layer using a slot-die coating method, drying was performed at a temperature of 100° C., and thermal treatment was performed at a temperature of 160° C. to finally manufacture a composite electrolyte membrane including a catalyst composite layer. At this time, the thickness of the first ion exchange layer was 6 μm, the thickness of the second ion exchange layer was 1 μm, and the thickness of the catalyst composite layer was 5 μm.

Example 2—Composite Electrolyte Membrane Manufactured by Manufacturing and Stacking Catalyst Composite Layer Step S42 was performed to manufacture a composite electrolyte membrane instead of step S41, compared to Example 1.

Specifically, (S42) the catalyst composite mixture prepared in S41 was applied to release paper using a slot-die coating method, and drying was performed at a temperature of 100° C. to manufacture a catalyst composite layer. Subsequently, the catalyst composite layer was transferred to the second ion exchange layer using a roll pressing method, and thermal treatment was performed at a temperature of 160° C. to manufacture a composite electrolyte membrane. At this time, the thickness of the first ion exchange layer was 6 μm, the thickness of the second ion exchange layer was 1 μm, and the thickness of the catalyst composite layer was 5 μm.

Comparative Example

A first ionomer layer was prepared using the same method as in S10 of Example 1, a reinforcement layer was impregnated in the same method as in S20 of Example 1, and a third ionomer layer was coated in the same method as in S30 of Example 1. The thickness of the first ionomer layer and the thickness of the third ionomer layer were equal to each other.

Experimental Example—Comparison in Open Circuit Voltage (OCV) and Fluorine Elution Concentration Between Composite Electrolyte Membranes The result of comparison in open circuit voltage (OCV) between the composite electrolyte membranes manufactured according to Example 1 and Example 2 of the present disclosure and the electrolyte membrane manufactured according to Comparative Example is shown in the graph of FIG. 4. Referring to this, it can be seen that the OCV values of the composite electrolyte membranes manufactured according to Example 1 and Example 2 were higher than the OCV value of the electrolyte membrane manufactured according to Comparative Example. That is, it can be seen that a composite electrolyte membrane according to the present disclosure including a separate catalyst composite layer, the position of which is controlled, is capable of reducing a side effect of a decrease in OCV due to crossover.

In addition, the result of comparison in post-endurance fluorine elution concentration between the composite electrolyte membrane manufactured according to Example 1 and the electrolyte membrane manufactured according to Comparative Example is shown in the graph of FIG. 5. Referring to this, it can be seen that the composite electrolyte membrane manufactured according to Example 1 had lower fluorine elution concentration than the electrolyte membrane manufactured according to Comparative Example.

As is apparent from the foregoing, the catalyst composite layer in the composite electrolyte membrane according to the present disclosure uniformly includes the catalyst and the antioxidant, whereby it is possible to inhibit generation of hydrogen peroxide by side reaction. In addition, the catalyst composite layer is formed as a separate layer, whereby the catalyst composite layer is instead degraded, greatly inhibiting membrane degradation even in the case in which radicals attack the ionomer due to small side reaction. Furthermore, it is possible to control the position of the catalyst composite layer including the catalyst and the antioxidant by adjusting the thicknesses of the second ion exchange layer and the catalyst composite layer, whereby it is possible to protect a specific degradation position, and therefore it is possible to efficiently improve membrane durability.

The effects of the present disclosure are not limited to those mentioned above. It should be understood that the effects of the present disclosure include all effects that can be inferred from the foregoing description of the present disclosure.

The disclosure has been described in detail with reference to preferred embodiments thereof. However, it will be appreciated by those skilled in the art that changes may be made in these embodiments without departing from the principles and spirit of the disclosure, the scope of which is defined in the appended claims and their equivalents.

What is claimed is:

1. A composite electrolyte membrane comprising:
  a first ion exchange layer comprising a first ionomer;
  a porous reinforcement layer located on the first ion exchange layer, the reinforcement layer being impregnated with a second ionomer;
  a second ion exchange layer located on the reinforcement layer, the second ion exchange layer comprising a third ionomer; and
  a catalyst composite layer located on the second ion exchange layer, comprising a catalyst, an antioxidant, and a fourth ionomer,
  wherein a thickness of the first ion exchange layer is 0.1 to 10 μm,
  wherein a thickness of the second ion exchange layer is 10 to 30% of a thickness of the first ion exchange layer,
  wherein a thickness ratio of the second ion exchange layer to the catalyst composite layer is 1:2 to 1:9,
  wherein the catalyst composite layer inhibits generation of hydrogen peroxide in the composite electrolyte membrane, wherein the composite electrolyte membrane is disposed between an anode electrode and a cathode electrode, and wherein the thickness of the second ion exchange layer is about 1 μm.

2. The composite electrolyte membrane according to claim 1, wherein a sum of a thickness of the second ion exchange layer and a thickness of the catalyst composite layer is equal to a thickness of the first ion exchange layer.

3. The composite electrolyte membrane according to claim 1, wherein a content of the antioxidant is 0.1 to 10 parts by weight based on 100 parts by weight of the fourth ionomer in the catalyst composite layer.

4. The composite electrolyte membrane according to claim 1, wherein the catalyst comprises at least one catalyst metal selected from a group consisting of platinum (Pt), palladium (Pd), ruthenium (Ru), iridium (Ir), gold (Au), silver (Ag), chromium (Cr), manganese (Mn), iron (Fe), cobalt (Co), nickel (Ni), copper (Cu), molybdenum (Mo), and yttrium (Y).

5. The composite electrolyte membrane according to claim 4, wherein a content of the catalyst metal is 0.1 to 15 parts by weight based on 100 parts by weight of the fourth ionomer in the catalyst composite layer.

6. The composite electrolyte membrane according to claim 1, wherein each of the first to fourth ionomers included in the first ion exchange layer, the reinforcement layer, the second ion exchange layer, and the catalyst composite layer, respectively, comprises at least one selected from a group consisting of a perfluorinated sulfonic acid (PFSA)-based ionomer, a hydrocarbon-based ionomer, and a combination thereof.

* * * * *